US012725804B2

(12) United States Patent
Zhou et al.

(10) Patent No.: US 12,725,804 B2
(45) Date of Patent: Sep. 1, 2026

(54) LITHIUM ION SECONDARY BATTERY NEGATIVE ELECTRODE ADDITIVE AND NEGATIVE ELECTRODE PASTE AND BATTERY INCLUDING SAME

(71) Applicant: Murata Manufacturing Co., Ltd., Nagaokakyo (JP)

(72) Inventors: Yan Zhou, Shanghai (CN); Li Wang, Shanghai (CN); Yuli Li, Shanghai (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 703 days.

(21) Appl. No.: 18/125,787

(22) Filed: Mar. 24, 2023

(65) Prior Publication Data

US 2023/0231138 A1 Jul. 20, 2023

Related U.S. Application Data

(63) Continuation of application No. PCT/CN2021/119864, filed on Sep. 23, 2021.

(30) Foreign Application Priority Data

Sep. 27, 2020 (CN) ........................ 202011032268.5

(51) Int. Cl.
*H01M 4/62* (2006.01)
*H01M 4/13* (2010.01)
*H01M 10/0525* (2010.01)
*H01M 4/02* (2006.01)

(52) U.S. Cl.
CPC ............... *H01M 4/62* (2013.01); *H01M 4/13* (2013.01); *H01M 10/0525* (2013.01); *H01M 2004/027* (2013.01)

(58) Field of Classification Search
CPC .... H01M 4/62; H01M 4/13; H01M 2004/027; H01M 10/052; H01M 10/0525
See application file for complete search history.

(56) References Cited

U.S. PATENT DOCUMENTS

| | | | | |
|---|---|---|---|---|
| 5,661,103 | A * | 8/1997 | Harms .................. | A01N 37/04 504/147 |
| 5,998,526 | A | 12/1999 | Suau et al. | |
| 6,537,457 | B1 * | 3/2003 | Bohnes .................... | C09D 7/71 210/698 |
| 2014/0154562 | A1 | 6/2014 | Fukuchi | |
| 2016/0260973 | A1 | 9/2016 | Sonobe et al. | |
| 2017/0012290 | A1 | 1/2017 | Watanabe et al. | |

(Continued)

FOREIGN PATENT DOCUMENTS

| | | | |
|---|---|---|---|
| CN | 1193036 | A | 9/1998 |
| CN | 103855402 | A | 6/2014 |
| CN | 105637682 | A | 6/2016 |

(Continued)

OTHER PUBLICATIONS

International Search Report in PCT/CN2021/119864, mailed Dec. 22, 2021, 3 pages.

(Continued)

*Primary Examiner* — Jeremiah R Smith
(74) *Attorney, Agent, or Firm* — Keating & Bennett, LLP

(57) ABSTRACT

A lithium ion secondary battery negative electrode additive includes polyaspartate salt and water.

14 Claims, 2 Drawing Sheets

(56) References Cited

U.S. PATENT DOCUMENTS

| | | | | |
|---|---|---|---|---|
| 2019/0157664 | A1* | 5/2019 | Yamamoto | H01M 50/119 |
| 2021/0320342 | A1* | 10/2021 | Zama | H01G 11/26 |

FOREIGN PATENT DOCUMENTS

| | | | |
|---|---|---|---|
| CN | 105637683 | A | 6/2016 |
| WO | 2015/118834 | A1 | 8/2015 |
| WO | 2019/065883 | A1 | 4/2019 |

OTHER PUBLICATIONS

Written Opinion in PCT/CN2021/119864, mailed Dec. 22, 2021, 3 pages.

* cited by examiner

LITHIUM ION SECONDARY BATTERY NEGATIVE ELECTRODE ADDITIVE AND NEGATIVE ELECTRODE PASTE AND BATTERY INCLUDING SAME

CROSS REFERENCE TO RELATED APPLICATIONS

This application claims the benefit of priority to Chinese Patent Application No. 202011032268.5 filed on Sep. 27, 2020, and is a Continuation Application of PCT/CN2021/119864 filed on Sep. 23, 2021. The entire contents of each application are hereby incorporated herein by reference.

BACKGROUND OF THE INVENTION

1. Field of the Invention

The present invention relates to the field of lithium ion secondary batteries, in particular to a lithium ion secondary battery negative electrode additive, a negative electrode paste including the same, and a battery.

2. Description of the Related Art

Along with the continuous updating of electronic technology, the requirements for a battery device for supporting the energy supply of electronic device are also increased. Nowadays, batteries capable of storing a high amount of electricity and outputting high power are needed. Traditional lead-acid batteries and nickel hydrogen batteries and the like may not meet the requirements of new electronic products. Therefore, lithium batteries have attracted more and more attention. During the development process of lithium batteries, the capacity and performance have been effectively improved.

Lithium batteries in the prior art can be grouped into two categories: a lithium metal battery and a lithium ion battery. Lithium metal batteries use lithium metal or lithium alloy as the negative electrode, which is dangerous, therefore they are rarely used in the electronic products in daily life. Lithium ion batteries do not contain metallic state lithium, and usually use lithium alloy metal oxide as the positive electrode material and graphite as the negative electrode material. However, the commonly used lithium ion secondary battery still has many disadvantages. In the prior art, the electrochemical performance of lithium ion secondary batteries, especially the cycle retention rate and discharge efficiency, is still undesirable.

SUMMARY OF THE INVENTION

Preferred embodiments of the present invention provide lithium ion secondary battery negative electrode additives and negative electrode pastes each including the same, so as to improve electrochemical performance of lithium ion secondary batteries.

According to a preferred embodiment of the present invention, a lithium ion secondary battery negative electrode additive includes polyaspartate salt and water.

In a lithium ion secondary battery negative electrode additive according to a preferred embodiment of the present invention, the polyaspartate salt includes potassium polyaspartate, sodium polyaspartate, or barium polyaspartate, or any combination thereof.

In a lithium ion secondary battery negative electrode additive according to a preferred embodiment of the present invention, a content of the polyaspartate salt ranges from about 40 wt % to about 50 wt %, and based on a total weight of the lithium ion secondary battery negative electrode additive, an amount of insoluble matter of the polyaspartate salt is less than about 30 wt %.

In a lithium ion secondary battery negative electrode additive according to a preferred embodiment of the present invention, based on the total weight of the lithium ion secondary battery negative electrode additive, the amount of the insoluble matter of the polyaspartate salt is less than about 15 wt %.

According to a preferred embodiment of the present invention, a lithium ion secondary battery negative electrode paste includes a lithium ion secondary battery negative electrode additive according to a preferred embodiment the present invention, a negative electrode active material, and a conductive agent.

A lithium ion secondary battery negative electrode paste according to a preferred embodiment of the present invention includes a lithium ion secondary battery negative electrode additive, a negative electrode active material, a binder, a thickener, and a conductive agent.

In a lithium ion secondary battery negative electrode paste according to a preferred embodiment of the present invention, based on a total weight of the negative electrode active material, an amount of the polyaspartate salt in the lithium ion secondary battery negative electrode additive ranges from about 0.05 wt % to about 3 wt %.

In a lithium ion secondary battery negative electrode paste according to a preferred embodiment of the present invention, based on the total weight of the negative electrode active material, the amount of the polyaspartate salt in the lithium ion secondary battery negative electrode additive ranges from about 0.05 wt % to about 0.5 wt %.

In a lithium ion secondary battery negative electrode paste according to a preferred embodiment of the present invention, the lithium ion secondary battery negative electrode paste includes about 85 to about 95 parts by weight of the negative electrode active material, about 1 part by weight to about 5 parts by weight of the binder, about 1 part by weight to about 5 parts by weight of the thickener, about 1 part by weight to about 5 parts by weight of the conductive agent, and a predetermined amount of the polyaspartate salt, so that the amount of the polyaspartate salt therein is about 0.05 wt % to about 3 wt % of the total weight of the negative electrode active material.

In a lithium ion secondary battery negative electrode paste according to a preferred embodiment of the present invention, the negative electrode active material includes hardly graphitizable carbon, easily graphitizable carbon, graphite, pyrolytic carbon, coke, glassy carbon, organic polymer sintered body, carbon fiber, activated carbon, and graphite including a silicon-based material and a silicon-based material.

According to a preferred embodiment of the present invention, a lithium ion secondary battery includes a positive electrode sheet, a negative electrode sheet, and a separator. The negative electrode sheet is coated with a lithium ion secondary battery negative electrode paste according to a preferred embodiment of the present invention.

Preferred embodiments of the present invention each improve electrochemical performances of lithium ion secondary batteries, especially discharge capacity, charge-discharge efficiency, and capacity retention rate at both room temperature and low temperature.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
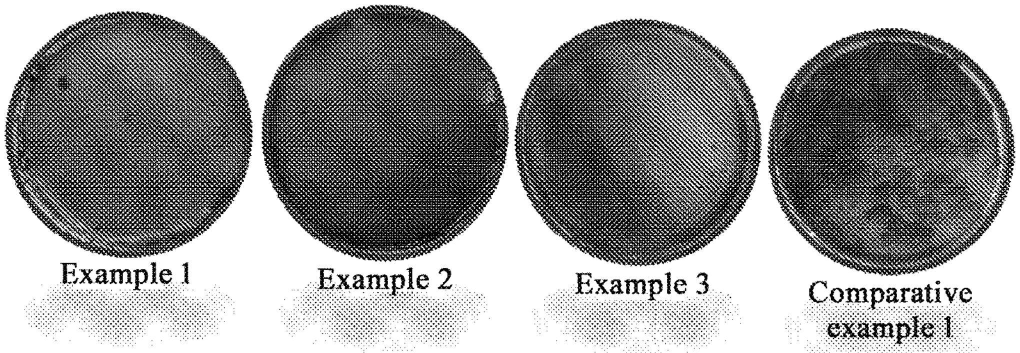
FIG. 1 shows dispersion of a lithium ion secondary battery negative electrode paste according to examples 1-3 of preferred embodiments of the present invention and comparative example 1 in an aqueous medium.

Preferred embodiments of the present invention and features in the preferred embodiments of the present invention can be combined with each other without departing from the spirit of the present disclosure. The present invention will be described in detail below with reference to the drawings and preferred embodiments.

As explained in the background, a dispersant is usually added to the lithium ion secondary battery negative electrode additive in the prior art to make the paste have good dispersity in the preparation process. However, due to the addition of a dispersant, the electrochemical performance of the battery, especially the cycle retention rate and discharge efficiency, is adversely reduced. To address this, according to a preferred embodiment of the present invention, a lithium ion secondary battery negative electrode additive is provided. The lithium ion secondary battery negative electrode additive includes polyaspartate salt and water.

Different from the lithium ion secondary battery additive in the prior art, the additive according to a preferred embodiment of the present invention includes polyaspartate salt as a dispersant. Polyaspartate salt is a water-soluble polymer salt, which connects multiple amino acid molecules through peptide bonds. Since a large number of hydrophilic carboxyl, carbonyl, and amino groups are included in the structure of polyaspartate salt, polyaspartate salt can display both hydrophilic and lipophilic properties at the same time, thus achieving the effect of a dispersant. After adding polyaspartate salt to the lithium ion secondary battery negative electrode paste, it was discovered that the negative electrode active material was able to be well dispersed in the aqueous paste.

The negative electrode sheet including the negative electrode additive is prepared by, for example, the method as follows: mixing the negative electrode active material and the conductive agent evenly in an aqueous medium, then adding a thickener and stirring. Then, adding the lithium ion secondary battery negative electrode additive including polyaspartate salt and water and continuously stirring, finally adding the binder and stirring evenly to obtain the negative electrode paste. The obtained negative electrode paste is allowed to stand for a desired period of time, and then the resulting negative electrode paste is coated on the metal foil, and the negative electrode sheet is obtained after drying at, for example, about 80° C.

In the process of preparing the negative electrode sheet, because the negative electrode additive is added, the negative electrode active material can be evenly dispersed in the aqueous medium, so as to form a negative electrode paste with good dispersity. Since the negative electrode paste has uniform or substantially uniform dispersity, the negative electrode active material and the conductive agent in the negative electrode paste are evenly distributed on the metal foil after being coated on the metal foil. The electrochemical performance of the lithium ion secondary battery is improved when obtained negative electrode sheet is used.

In a preferred embodiment of the present invention, polyaspartate salt includes potassium polyaspartate, sodium polyaspartate, or barium polyaspartate, or any combination thereof. In a preferred embodiment of the present invention, polyaspartate salt includes potassium polyaspartate or sodium polyaspartate, or any combination thereof.

According to a preferred embodiment of the present invention, the content of the polyaspartate salt in the lithium ion secondary battery negative electrode additive, for example, ranges from about 40 wt % to about 50 wt %, and based on the total weight of the lithium ion secondary battery negative electrode additive, the amount of the insoluble matter of polyaspartate salt therein is, for example, less than about 30 wt %. In a preferred embodiment of the present invention, based on the total weight of the lithium ion secondary battery negative electrode additive, the amount of the insoluble matter of polyaspartate salt is, for example, less than about 15 wt %.

The content of the insoluble matter (% insoluble matter) of polyaspartate salt in the suspension of the obtained lithium ion secondary battery negative electrode additive is determined by, for example, the following method: weighing a predetermined weight of polyaspartate salt ($w_{polyaspartate\ salt}$) and a certain weight of deionized water ($W_{water}$) mixing the polyaspartate salt ($W_{polyaspartate\ salt}$) and the deionized water ($W_{water}$) to obtain the negative electrode additive, filtering and drying the obtained negative electrode additive suspension to obtain a solid content, drying the solid content to a constant weight, then weighing to obtain the weight of the dried solid content ($W_{solid\ content}$), which are then calculated according to the following equation:

$$\%\ \text{insoluble matter}=(W_{solid\ content}/(W_{polyaspartate\ salt}+W_{water}))\times 100\%.$$

When the content of polyaspartate salt in the lithium ion secondary battery negative electrode additive is less than about 40 wt %, the content of polyaspartate salt is insufficient, which cannot effectively achieve the advantageous dispersion effect. When the content of polyaspartate salt in the lithium ion secondary battery negative electrode additive is more than about 50 wt %, the excessive polyaspartate salt will adversely affect the conductivity of the battery.

When the insoluble matter of polyaspartate salt in the lithium ion secondary battery negative electrode additive is more than about 30 wt % based on the total weight of the lithium ion secondary battery negative electrode additive, the water solubility of polyaspartate salt is insufficient, thus the effective dispersion effect cannot be achieved. In different preferred embodiments of the present application, based on the total weight of the lithium ion secondary battery negative electrode additive, the amount of the insoluble matter of polyaspartate salt in the lithium ion secondary battery negative electrode additive is, for example, less than about 25 wt %, less than about 20 wt %, less than about 15 wt %, less than about 10 wt %, less than about 7 wt %, less than about 6 wt %, less than about 5 wt %, less than about 4 wt %, less than about 3 wt %, or less than about 2 wt %.

In different preferred embodiments of the present invention, in the lithium ion secondary battery negative electrode additive, the content of the polyaspartate salt is, for example, more than about 42 wt % and, based on the total weight of the lithium ion secondary battery negative electrode additive, the amount of insoluble matter of polyaspartate salt is, for example, less than about 25 wt %; the content of polyaspartate salt is, for example, more than about 45 wt % and, based on the total weight of the lithium ion secondary battery negative electrode additive, the amount of the insoluble matter of polyaspartate salt is, for example, less than about 20 wt %; the content of polyaspartate salt is, for example, more than about 47 wt % and, based on the total weight of the lithium ion secondary battery negative electrode additive, the amount of the insoluble matter of polyaspartate salt is, for example less than about 15 wt %; and the content of polyaspartate salt is, for example, more than about 42 wt % and, based on the total weight of the lithium ion secondary battery negative electrode additive, the amount of the insoluble matter of polyaspartate salt is, for example, less than about 10 wt %; the content of polyaspartate salt is, for example, more than about 40 wt % and, based on the total weight of the lithium ion secondary battery negative electrode additive, the amount of the insoluble matter of polyaspartate salt is, for example, less than about 5 wt %; the content of polyaspartate salt is, for example, more than about 46 wt % and, based on the total weight of the lithium ion secondary battery negative electrode additive, the amount of the insoluble matter of polyaspartate salt is, for example, less than about 3 wt %; and the content of polyaspartate salt is, for example, more than about 40 wt % and, based on the total weight of the lithium ion secondary battery negative electrode additive, the amount of the insoluble matter of polyaspartate salt is, for example, less than about 2 wt %.

According to a preferred embodiment of the present application, a lithium ion secondary battery negative electrode paste is provided. The lithium ion secondary battery negative electrode paste includes a lithium ion secondary battery negative electrode additive according to a preferred embodiment of present invention, a negative electrode active material, and a conductive agent, wherein the lithium ion secondary battery negative electrode additive includes polyaspartate salt and water.

In a preferred embodiment of the present invention, a lithium ion secondary battery negative electrode paste includes the lithium ion secondary battery negative electrode additive according to a preferred embodiment of the present invention, a negative electrode active material, a binder, a thickener and a conductive agent, wherein the lithium ion secondary battery negative electrode additive includes polyaspartate salt and water. In the present preferred embodiment, when preparing the negative electrode paste, the negative electrode additive including polyaspartate salt and water is added to the mixed paste of the negative electrode active material, the conductive agent, and the thickener at the same time, and finally the binder is added and stirred evenly to obtain the negative electrode paste.

According to a preferred embodiment of the present invention, a lithium ion secondary battery is provided. The lithium ion secondary battery includes a positive electrode sheet, a negative electrode sheet, and a separator, wherein the negative electrode sheet is coated with the lithium ion secondary battery negative electrode paste according to a preferred embodiment of the present invention.

Since the polyaspartate salt acts as a dispersant and provides a dispersion function, the lithium ion secondary battery negative electrode paste has superior dispersity. In addition, because polyaspartate salt is a long-chain polymer, entanglement will occur in the process of drying the paste to prepare the negative electrode sheet, so as to increase the adhesion effect of the paste to the metal foil. After being coated on the metal foil, the conductive agent in the negative electrode paste is evenly distributed on the metal foil due to its uniform or substantially uniform dispersity. The electrochemical performance of the lithium ion secondary battery is improved when the negative electrode sheet is used.

In a preferred embodiment of the present invention, polyaspartate salt is selected from any one of potassium polyaspartate, sodium polyaspartate and barium polyaspartate, or any combination thereof. In a preferred embodiment of the present invention, polyaspartate salt is selected from any one of potassium polyaspartate, and sodium polyaspartate, or any combination thereof.

In a preferred embodiment of the present invention, based on the total weight of the negative electrode active material, the amount of the polyaspartate salt in the lithium ion secondary battery negative electrode additive ranges from, for example, about 0.05 wt % to about 3 wt %. Since the lithium ion secondary battery negative electrode paste usually includes a negative electrode active material, a binder, a thickener, and a conductive agent, and the polyaspartate salt is used to effectively disperse the negative electrode active material, the inventors of preferred embodiments of the present invention discovered that the negative electrode active material can be evenly dispersed in the negative electrode paste within the range of the above addition amount after a large amount of experiments, and would not adversely affect the effect of other components (such as the binder, thickener and conductive agent).

The lower limit of the addition amount of polyaspartate salt in the lithium ion secondary battery negative electrode additive can be, for example, in a range of about 0.05 wt %, about 0.06 wt %, about 0.07 wt %, about 0.1 wt %, about 0.15 wt %, about 0.2 wt %, about 0.25 wt %, about 0.5 wt %, about 0.75 wt %, about 1 wt %, about 1.25 wt %, about 1.5 wt %, about 1.75 wt %, about 2 wt %, about 2.25 wt %, about 2.5 wt %, and about 2.75 wt % of the total weight of the negative electrode active material, and the upper limit of the addition amount of polyaspartate salt in the lithium ion secondary battery negative electrode additive can be, for example, in a range of about 2.5 wt %, about 2.6 wt %, about 2.7 wt %, about 2.8 wt %, about 2.9 wt %, and about 3 wt % of the total weight of the negative electrode active material.

Specifically, the addition amount of polyaspartate salt in the lithium ion secondary battery negative electrode additive can be, for example, in a range of about 0.05 wt % to about 3 wt %, about 0.06 wt % to about 3 wt %, about 0.07 wt % to about 3 wt %, about 0.08 wt % to about 3 wt %, about 0.09 wt % to about 3 wt %, about 0.1 wt % to about 3 wt %, about 0.15 wt % to about 3 wt %, about 0.2 wt % to about 3 wt %, about 0.25 wt % to about 3 wt %, about 0.3 wt % to about 3 wt %, about 0.5 wt % to about 3 wt %, about 0.75 wt % to about 3 wt %, about 1 wt % to about 3 wt %, about 1 wt % to about 2 wt %, about 1.25 wt % to about 3 wt %, about 1.5 wt % to about 3 wt %, about 1.75 wt % to about 3 wt %, about 2 wt % to about 3 wt %, about 2.25 wt % to about 3 wt %, about 2.5 wt % to about 3 wt %, about 2.75 wt % to about 3 wt %, about 0.05 wt % to about 0.3 wt %, about 0.06 wt % to about 0.3 wt %, about 0.07 wt % to about 0.3 wt %, about 0.08 wt % to about 0.3 wt %, about 0.09 wt % to about 0.3 wt %, about 0.1 wt % to about 0.3 wt %, about 0.3 wt % to about 0.5 wt %, about 0.3 wt % to about 0.6 wt %, about 0.3 wt % to about 0.7 wt %, about 0.3 wt % to about 0.8 wt %, about 0.3 wt % to about 0.9 wt %, about 0.3 wt % to about 1.0 wt % of the total weight of the negative electrode active material.

In the above-described preferred embodiments, preferably the lithium ion secondary battery negative electrode paste includes, for example, about 85 to about 95 parts by weight of the negative electrode active material, about 1 part by weight to about 5 parts by weight of the binder, about 1 part by weight to about 5 parts by weight of the thickener, about 1 part by weight to about 5 parts by weight of the conductive agent, and a predetermined amount of the polyaspartate salt, so that the amount of the polyaspartate salt therein is about 0.05 wt % to about 5 wt % of the total weight of the negative electrode active material. Within the above numerical ranges, the negative electrode paste can be prepared with an optimum or improved ratio, and the negative electrode paste has good dispersity.

The negative electrode active material included in the negative electrode paste includes graphite including silicon-based material. The negative electrode active material includes one or more negative electrode materials that can absorb and release lithium as the negative electrode active material. Examples of negative electrode materials that can absorb and release lithium include various carbon materials and silicon-based materials, such as hardly graphitizable carbon, easily graphitizable carbon, graphite, pyrolytic carbon, coke, glassy carbon, organic polymer sintered body, carbon fiber, activated carbon, a silicon oxide material, a silicon carbon material such as graphite containing a silicon-based material, or a silicon alloy. Among these materials, examples of coke include pitch coke, needle coke and petroleum coke. The organic polymer sintered body is obtained by roasting and carbonizing polymer materials such as phenolic resin or furan resin, etc., at an appropriate temperature. Some organic polymer sintered bodies are divided into hardly graphitizable carbon, or easily graphitizable carbon. Among which, graphite including a silicon-based material is preferred.

Preferred embodiments of the present invention will be further described in detail below in combination with specific examples, which are understood as not limiting the scope of the present invention.

Figure 2:
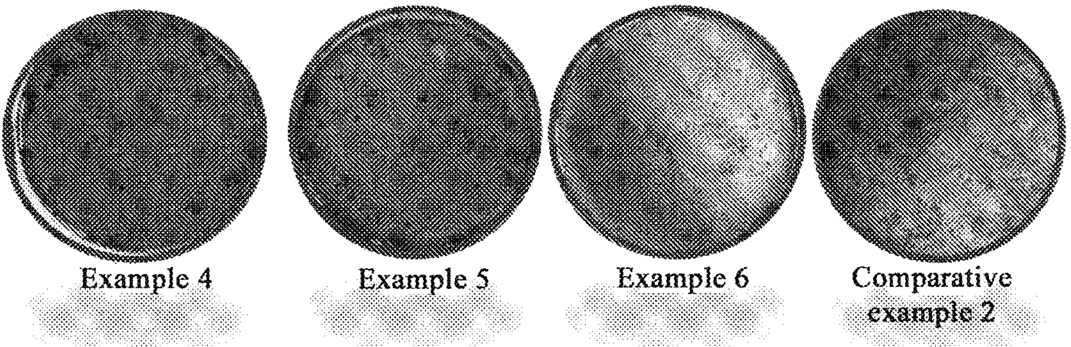
FIG. 2 shows dispersion of lithium ion secondary battery negative electrode pastes according to examples 4-6 of preferred embodiments of the present invention and comparative example 2 in an aqueous medium.

The dispersion effect of the lithium ion secondary battery negative electrode additive on the electrode active material is observed through the following examples 1-6 of preferred embodiments of the present invention and comparative examples 1-2. FIG. 1 and FIG. 2 show the apparent dispersions of examples 1-3 and comparative example 1 (FIG. 1) and of examples 4-6 and comparative example 2 (FIG. 2), taken by camera, respectively.

Example 1

1) Preparation of lithium ion secondary battery negative electrode additive: about 40 g of sodium polyaspartate was weighed and added into about 60 g of water while stirring to prepare a suspension of lithium ion secondary battery negative electrode additive. The content of the insoluble matter of sodium polyaspartate therein was determined to be about 1%. As a result, the lithium ion secondary battery negative electrode additive including a content of about 40% of sodium polyaspartate and a content of about 1% of insoluble matter of sodium polyaspartate therein was prepared.

2) Preparation of lithium ion secondary battery negative electrode paste: about 0.15 g of the lithium ion secondary battery negative electrode additive including sodium polyaspartate (about 0.06 g of sodium polyaspartate was included therein) prepared in step 1 was weighed, and added into about 15 g of water while stirring, then about 3 g of graphite active material was added into the aqueous solution of the lithium ion secondary battery negative electrode additive, stirred until the graphite active material at the bottom was stirred up to form a suspension, the suspension was allowed to stand for about 30 minutes, then the dispersion effect was observed.

Example 2

1) Preparation of lithium ion secondary battery negative electrode additive: about 40 g of potassium polyaspartate was weighed and added into about 60 g of water while stirring to prepare a suspension of lithium ion secondary battery negative electrode additive. The content of the insoluble matter of potassium polyaspartate therein was determined to be about 2%. As a result, the lithium ion secondary battery negative electrode additive including a content of about 40% of potassium polyaspartate and a content of about 2% of insoluble matter of potassium polyaspartate therein was prepared.

2) Preparation of lithium ion secondary battery negative electrode paste: about 0.15 g of the lithium ion secondary battery negative electrode additive including potassium polyaspartate (about 0.06 g of potassium polyaspartate was included therein) prepared in step 1 was weighed, and added into about 15 g of water while stirring, then about 3 g of graphite active material was added into the aqueous solution of the lithium ion secondary battery negative electrode additive, stirred until the graphite active material at the bottom was stirred up to form a suspension, the suspension was allowed to stand for about 30 minutes, then the dispersion effect was observed.

Example 3

1) Preparation of lithium ion secondary battery negative electrode additive: about 20 g of potassium polyaspartate and about 20 g of sodium polyaspartate were weighed and added into about 60 g of water while stirring to prepare a suspension of lithium ion secondary battery negative electrode additive. The content of the insoluble matter of polyaspartate salt therein was determined to be about 2%. As a result, the lithium ion secondary battery negative electrode additive including a content of about 40% of polyaspartate salt and a content of about 2% of insoluble matter of potassium polyaspartate therein was prepared.

2) Preparation of lithium ion secondary battery negative electrode paste: about 0.15 g of the lithium ion secondary battery negative electrode additive including polyaspartate salt (about 0.06 g of polyaspartate salt was included therein) prepared in step 1 was weighed, and added into about 15 g of water while stirring, then about 3 g of graphite active material was added into the aqueous solution of the lithium ion secondary battery negative electrode additive, continuously stirred until the graphite active material at the bottom was stirred up to form a suspension, the suspension was allowed to stand for about 30 minutes, then the dispersion effect was observed.

Comparative Example 1

About 3 g of graphite active material was directly added into about 15 g of water, stirred until the graphite active material at the bottom was stirred up to form a suspension, which was allowed to stand for about 30 minutes, then the dispersion effect was observed.

Example 4

1) Preparation of lithium ion secondary battery negative electrode additive: about 40 g of sodium polyaspartate was weighed and added into about 60 g of water while stirring to prepare a suspension of lithium ion secondary battery negative electrode additive. The content of the insoluble matter of sodium polyaspartate therein was determined to be about 1%. As a result, the lithium ion secondary battery negative electrode additive including a content of about 40% of sodium polyaspartate and a content of about 1% of insoluble matter of sodium polyaspartate therein was prepared.

2) Preparation of lithium ion secondary battery negative electrode paste: about 0.15 g of the lithium ion secondary battery negative electrode additive including sodium polyaspartate (about 0.06 g of sodium polyaspartate was included therein) prepared in step 1 was weighed, and added into about 15 g of water while stirring, then about 3 g of silicon oxide ($SiO_x$, $0<x<1$) material was added into the aqueous solution of the lithium ion secondary battery negative electrode additive, continuously stirred until the silicon oxide material at the bottom was stirred up to form a suspension, the suspension was allowed to stand for about 30 minutes, then the dispersion effect was observed.

Example 5

1) Preparation of lithium ion secondary battery negative electrode additive: about 40 g of potassium polyaspartate was weighed and added into about 60 g of water while stirring to prepare a suspension of lithium ion secondary battery negative electrode additive. The content of the insoluble matter of potassium polyaspartate therein was determined to be about 2%. As a result, the lithium ion secondary battery negative electrode additive including a content of about 40% of potassium polyaspartate and a content of about 2% of insoluble matter of potassium polyaspartate therein was prepared.

2) Preparation of lithium ion secondary battery negative electrode paste: about 0.15 g of the lithium ion secondary battery negative electrode additive including potassium polyaspartate (about 0.06 g of potassium polyaspartate was included therein) prepared in step 1 was weighed, and added into about 15 g of water while stirring, then about 3 g of silicon oxide material was added into the aqueous solution of the lithium ion secondary battery negative electrode additive, continuously stirred until the silicon oxide material at the bottom was stirred up to form a suspension, the suspension was allowed to stand for about 30 minutes, then the dispersion effect was observed.

Example 6

1) Preparation of lithium ion secondary battery negative electrode additive: about 20 g of potassium polyaspartate and about 20 g of sodium polyaspartate were weighed and added into about 60 g of water while stirring to prepare a suspension of lithium ion secondary battery negative electrode additive. The content of the insoluble matter of polyaspartate salt therein was determined to be about 2%. As a result, the lithium ion secondary battery negative electrode additive including a content of about 40% of polyaspartate salt and a content of about 2% of insoluble matter of polyaspartate salt therein was prepared.

2) Preparation of lithium ion secondary battery negative electrode paste: about 0.15 g of the lithium ion secondary battery negative electrode additive including polyaspartate salt (about 0.06 g of polyaspartate salt was included therein) prepared in step 1 was weighed, and added into about 15 g of water while stirring, then about 3 g of silicon oxide active material was added into the aqueous solution of the lithium ion secondary battery negative electrode additive, continuously stirred until the graphite active material at the bottom was stirred up to form a suspension, the suspension was allowed to stand for about 30 minutes, then the dispersion effect was observed.

Comparative Example 2

About 3 g of silicon oxide material was directly added into about 15 g of water, stirred until the silicon oxide material at the bottom was stirred up to form a suspension, which was allowed to stand for about 30 minutes, then the dispersion phenomenon was observed.

The experimental results of the dispersion of electrode active materials according to examples 1-6 and comparative examples 1-2 in water are shown in FIG. 1 and FIG. 2, respectively, wherein FIG. 1 shows the experimental results of the dispersion of electrode active materials according to examples 1-3 and comparative example 1 in water, and FIG. 2 shows the experimental results of the dispersion of electrode active materials according to examples 4-6 and comparative example 2 in water.

From the above examples and comparative examples, it can be seen that in examples 1-6 of preferred embodiments of the present invention, where potassium and/or sodium polyaspartate are added, respectively to prepare the lithium ion secondary battery negative electrode additive, the electrode active materials are well dispersed in the solvent and form a suspension. However, the negative electrode active materials in comparative examples 1-2 without adding any additives are suspended on the surface of the solvent, and it can be clearly seen from the results of comparative example 1 that a large amount of graphite active materials aggregate together, and it can also be seen from comparative example 2 that the negative electrode active materials including a large amount of silicon oxide aggregate on the surface of the aqueous solvent. Therefore, it can be concluded that in the case of using the additive of preferred embodiments of the present invention, since the surface tension of the electrode active material or other materials to be added in the negative electrode in an aqueous solvent can be effectively reduced by the polyaspartate salt selected from potassium polyaspartate or sodium polyaspartate, etc., contributing to their dispersion in the electrode paste, various materials in the finally prepared electrode material such as electrode active material, conductive agent, and binder, etc., are evenly dispersed in the electrode material.

The following examples and comparative examples show the improvement of the battery performance by the lithium ion secondary battery negative electrode sheet which was obtained by first preparing the lithium ion secondary battery negative electrode additive with a polyaspartate salt, such that further preparing the lithium ion secondary battery negative electrode paste and then using the same to coat the lithium ion secondary battery negative electrode sheet, and then drying.

Example 7

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 5.58 g of deionized water aqueous solution/suspension including sodium polyaspartate (negative electrode additive) prepared as follows was added, wherein the addition amount of sodium polyaspartate was 2.79 g (about 3 wt % based on the total weight of the active material), (wherein the content of sodium polyaspartate in the deionized aqueous solution/suspension of sodium polyaspartate was about 50%, and the amount of insoluble matter of sodium polyaspartate in the aqueous solution/suspension was about 5%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 8

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 0.1175 g of deionized water aqueous solution/suspension including sodium polyaspartate (negative electrode additive) prepared as follows was added, wherein the addition amount of sodium polyaspartate was about 0.047 g (about 0.05 wt % based on the total weight of the active material), (wherein the content of sodium polyaspartate in the deionized aqueous solution/suspension of sodium polyaspartate was about 40%, and the amount of insoluble matter of sodium polyaspartate in the aqueous solution/suspension was about 2%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 9

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 0.558 g of deionized water aqueous solution/suspension including sodium polyaspartate (negative electrode additive) prepared as follows was added, wherein the addition amount of sodium polyaspartate was about 0.279 g (about 0.3 wt % based on the total weight of the active material), (wherein the content of sodium polyaspartate in the deionized aqueous solution/suspension of sodium polyaspartate was about 50%, and the amount of insoluble matter of sodium polyaspartate in the aqueous solution/suspension was about 1%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 10

1) Preparation of negative electrode sheet: about 93 g of graphite containing a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 1.1625 g of deionized water aqueous solution/suspension including sodium polyaspartate (negative electrode additive) prepared as follows was added, wherein the addition amount of sodium polyaspartate was about 0.465 g (about 0.5 wt % based on the total weight of the active material), (wherein the content of sodium polyaspartate in the deionized aqueous solution/suspension of sodium polyaspartate was about 40%, and the amount of insoluble matter of sodium polyaspartate in the aqueous solution/suspension was about 3%), stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Comparative Example 3

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Comparative Example 4

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 11.625 g of deionized water aqueous solution/suspension including sodium polyaspartate (negative electrode additive) prepared as follows was added, wherein the addition amount of sodium polyaspartate was about 4.65 g (about 5 wt % based on the total weight of the active material), (wherein the content of sodium polyaspartate in the deionized aqueous solution/suspension of sodium polyaspartate was about 40%, and the amount of insoluble matter of sodium polyaspartate in the aqueous solution/suspension was about 1%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 11

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 5.58 g of deionized water aqueous solution/suspension including potassium polyaspartate (negative electrode additive) prepared as follows was added, wherein the addition amount of potassium polyaspartate was about 2.79 g (about 3 wt % based on the total weight of the active material), (wherein the content of potassium polyaspartate in the deionized aqueous solution/suspension of potassium polyaspartate was about 50%, and the amount of insoluble matter of potassium polyaspartate in the aqueous solution/suspension was about 5%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was preformed, and the cycle performance test at normal temperature at 1 C current was performed. The experimental results are shown in Table 1.

Example 12

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 0.1175 g of deionized water aqueous solution/suspension including potassium polyaspartate (negative electrode additive) prepared as follows was added, wherein the addition amount of potassium polyaspartate was about 0.047 g (about 0.05 wt % based on the total weight of the active material), (wherein the content of potassium polyaspartate in the deionized aqueous solution/suspension of potassium polyaspartate was about 40%, and the amount of insoluble matter of potassium polyaspartate in the aqueous solution/suspension was about 2%), continuously stirred for 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 13

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 0.558 g of deionized water aqueous solution/suspension including potassium polyaspartate (negative electrode additive) prepared as follows was added, wherein the addition amount of potassium polyaspartate was about 0.279 g (about 0.3 wt % based on the total weight of the active material), (wherein the content of potassium polyaspartate in the deionized aqueous solution/suspension of potassium polyaspartate was about 50%, and the amount of insoluble matter of potassium polyaspartate in the aqueous solution/suspension was 1%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at 10° C., the discharge rate performance test at about 3 C discharge current was performed, and the cycle performance test at normal temperature at 1 C current was performed. The experimental results are shown in Table 1.

Comparative Example 5

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 1.116 g of deionized water aqueous solution/suspension including sodium polyaspartate (negative electrode additive) prepared as follows was added, wherein the addition amount of sodium polyaspartate was about 0.279 g (about 0.3 wt % based on the total weight of the active material), (wherein the content of sodium polyaspartate in the deionized aqueous solution/suspension of sodium polyaspartate was 25%, and the amount of insoluble matter of sodium polyaspartate in the aqueous solution/suspension was 40%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 14

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 3.4875 g of deionized water aqueous solution/suspension including sodium polyaspartate (negative electrode additive) prepared as follows was added, wherein the addition amount of sodium polyaspartate was about 1.395 g (about 1.5 wt % based on the total weight of the active material), (wherein the content of potassium polyaspartate in the deionized aqueous solution/suspension of sodium polyaspartate was about 40%, and the amount of insoluble matter of sodium polyaspartate in the aqueous solution/suspension was about 1%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at about 10° C., the discharge rate performance test at about 3 C discharge current was performed, and the cycle performance test at normal temperature at 1 C current was performed. The experimental results are shown in Table 1.

Example 15

1) Preparation of negative electrode sheet: about 93 g of graphite including a silicon-based material (the negative electrode active material) and about 1.5 g of conductive agent Super-p were weighed and mixed evenly, about 2 g of thickener carboxymethyl cellulose (CMC) was added, then deionized water was added and stirred for about 15 minutes, and then about 5.8125 g of deionized water aqueous solution/suspension including sodium polyaspartate (negative electrode additive) prepared as follows was added, wherein the addition amount of sodium polyaspartate was about 2.325 g (about 2.5 wt % based on the total weight of the active material), (wherein the content of sodium polyaspartate in the deionized aqueous solution/suspension of sodium polyaspartate was about 40%, and the amount of insoluble matter of sodium polyaspartate in the aqueous solution/suspension was about 1%), continuously stirred for about 30 minutes, finally about 3.5 g of binder styrene butadiene rubber (SBR) was added and continuously stirred for about 30 minutes to obtain the negative electrode paste. The obtained negative electrode paste was allowed to stand for about 1 hour, and then the resulting paste was coated on the copper foil, then dried at about 80° C. to obtain the negative electrode sheet.

2) Assembly and test of battery: the obtained negative electrode sheet was placed into a vacuum oven for drying, wherein the drying temperature was about 100° C. and the vacuum degree of the oven was about −90 kPa. After drying for about 5 hours, the negative electrode sheet was removed from the vacuum oven, and subjected to the subsequent processing such as cut-parts, roll-in and die-cut, etc., after the negative electrode sheet was cooled.

Then the negative electrode sheet and the positive electrode sheet were assembled into a button half cell together, and an electrolyte with a concentration of about 1.08 mol/kg of $LiPF_6$ was injected into the experimental cell. The initial capacity and efficiency tests were performed at about 25° C., respectively, then the low temperature capacity test at about 0.5 C current was performed at 10° C., the discharge rate performance test at about 3 C discharge current was performed, and the cycle performance test at normal temperature at 1 C current was performed. The experimental results are shown in Table 1.

TABLE 1

Experimental results of electrical performance of examples 7-15 and comparative examples 3-5

| Examples | Initial discharge capacity (mAh/g) | Initial efficiency (%) | Discharge rate at 3C (%) | Discharge performance at 10° C. (Capacity at 10° C./Capacity at room temperature, %) | Cycle at room temperature (%/cycle) |
|---|---|---|---|---|---|
| Example 7 | 486 | 80.1 | 48.9 | 87.4 | 20.5/100 |
| Example 8 | 488 | 80 | 49.8 | 87.2 | 20.9/100 |
| Example 9 | 492 | 80.9 | 56.2 | 89.4 | 33.6/100 |
| Example 10 | 487 | 80.5 | 55.4 | 89.1 | 29.5/100 |

TABLE 1-continued

Experimental results of electrical performance of examples 7-15 and comparative examples 3-5

| Examples | Initial discharge capacity (mAh/g) | Initial efficiency (%) | Discharge rate at 3C (%) | Discharge performance at 10° C. (Capacity at 10° C./Capacity at room temperature, %) | Cycle at room temperature (%/cycle) |
|---|---|---|---|---|---|
| Comparative example 3 | 487 | 80 | 48.5 | 87.1 | 20/100 |
| Comparative example 4 | 457 | 78.5 | 28.4 | 84.4 | 7/100 |
| Example 11 | 487 | 80.2 | 48.7 | 87.3 | 20.7/100 |
| Example 12 | 487.5 | 80.1 | 48.9 | 87.3 | 20.6/100 |
| Example 13 | 490 | 80.5 | 55.9 | 89 | 33/100 |
| Comparative example 5 | 455 | 78.3 | 27 | 84 | 5/100 |
| Example 14 | 488.5 | 80.2 | 50 | 87.6 | 30.2/100 |
| Example 15 | 487 | 80.1 | 49.3 | 87.5 | 25/100 |

It can be seen from Table 1 above that when polyaspartate salt is used as the lithium ion secondary battery negative electrode additive, and an appropriate amount of polyaspartate salt is added to the deionized water solution/suspension, the amount of insoluble matter of polyaspartate salt in the aqueous solution/suspension is appropriate, such that the lithium ion secondary battery negative electrode paste is further prepared, the lithium ion secondary battery has excellent electrochemical performance, wherein example 9 and example 13 have the best electrochemical performance. It can be seen from the comparison with comparative example 3 that the results of the secondary battery in examples 7-10 to which a polyaspartate salt is added as the lithium ion secondary battery negative electrode additive are better than those of comparative example 3, especially the capacity retention rate at room temperature and low temperature.

In addition, in comparative example 4, excessive sodium polyaspartate (about 5 wt % based on the active material) was added as the lithium ion secondary battery negative electrode additive, which is higher than the amount of sodium polyaspartate that is within the range of about 0.05 wt % to about 3 wt % based on the total weight of the active material, therefore its electrochemical performance is adversely reduced. Moreover, the electrochemical performance of comparative example 4 is unfavorably lower than that of comparative example 3 (without adding polyaspartate salt), such as discharge capacity, charge-discharge efficiency, and capacity retention rate at room temperature and low temperature. Especially in terms of discharge rate, the result of comparative example 4 is only half of that in example 13.

In addition, since in the lithium ion secondary battery negative electrode additive in comparative example 5, the content of sodium polyaspartate in the deionized water aqueous solution/suspension of sodium polyaspartate is about 25%, which is lower than the range of about 40 wt % to about 50 wt % of the content of sodium polyaspartate, and the amount of insoluble matter of sodium polyaspartate in the aqueous solution/suspension is about 40%, which is higher than the range of less than about 30 wt % defined in the present invention, compared with example 13, the lithium ion secondary battery in comparative example 5 has a significant decrease in electrical performance, especially in the discharge rate, which is only half of that in example 13, and its electrical performance is also significantly worse than that in comparative example 3 (without adding polyaspartate salt).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A lithium ion secondary battery negative electrode paste, comprising:
- a lithium ion secondary battery negative electrode additive including polyaspartate salt and water;
- a negative electrode active material; and
- a conductive agent; wherein
- the polyaspartate salt includes potassium polyaspartate, sodium polyaspartate, or barium polyaspartate, or any combination thereof.

2. The lithium ion secondary battery negative electrode paste according to claim 1, further comprising a binder and a thickener.

3. The lithium ion secondary battery negative electrode paste according to claim 2, wherein the lithium ion secondary battery negative electrode paste includes 85 to 95 parts by weight of the negative electrode active material, 1 part by weight to 5 parts by weight of the binder, 1 part by weight to 5 parts by weight of the thickener, 1 part by weight to 5 parts by weight of the conductive agent, and an amount of the polyaspartate salt is 0.05 wt % to 3 wt % of the total weight of the negative electrode active material.

4. The lithium ion secondary battery negative electrode paste according to claim 1, wherein based on a total weight of the negative electrode active material, an amount of the polyaspartate salt in the lithium ion secondary battery negative electrode additive ranges from 0.05 wt % to 3 wt %.

5. The lithium ion secondary battery negative electrode paste according to claim 4, wherein based on the total weight of the negative electrode active material, the amount of the polyaspartate salt in the lithium ion secondary battery negative electrode additive ranges from 0.05 wt % to 0.5 wt %.

6. The lithium ion secondary battery negative electrode paste according to claim 1, wherein the negative electrode active material includes non-graphitizable carbon, graphitizable carbon, graphite, pyrolytic carbon, coke, glassy carbon, organic polymer sintered body, carbon fiber, activated carbon, or graphite including a silicon-based material and a silicon-based material.

7. The lithium ion secondary battery negative electrode paste according to claim 1, wherein
- a content of the polyaspartate salt in the lithium ion secondary battery negative electrode additive ranges from 40 wt % to 50 wt %; and
- based on a total weight of the lithium ion secondary battery negative electrode additive, an amount of insoluble matter of polyaspartate salt is less than 30 wt %.

8. The lithium ion secondary battery negative electrode paste according to claim 7, wherein based on the total weight of the lithium ion secondary battery negative electrode additive, the amount of the insoluble matter of polyaspartate salt is less than 15 wt %.

9. A lithium ion secondary battery comprising:
- a positive electrode sheet;
- a negative electrode sheet; and
- a separator; wherein the negative electrode sheet is coated with the lithium ion secondary battery negative electrode paste according to claim 1.

10. The lithium ion secondary battery according to claim 9, wherein the lithium ion secondary battery negative electrode paste includes a binder and a thickener.

11. The lithium ion secondary battery according to claim 10, wherein the lithium ion secondary battery negative electrode paste includes 85 to 95 parts by weight of the negative electrode active material, 1 part by weight to 5 parts by weight of the binder, 1 part by weight to 5 parts by weight of the thickener, 1 part by weight to 5 parts by weight of the conductive agent, and an amount of the polyaspartate salt is 0.05 wt % to 3 wt % of the total weight of the negative electrode active material.

12. The lithium ion secondary battery according to claim 9, wherein based on a total weight of the negative electrode active material, an amount of the polyaspartate salt in the lithium ion secondary battery negative electrode additive ranges from 0.05 wt % to 3 wt %.

13. The lithium ion secondary battery according to claim 12, wherein based on the total weight of the negative electrode active material, the amount of the polyaspartate salt in the lithium ion secondary battery negative electrode additive ranges from 0.05 wt % to 0.5 wt %.

14. The lithium ion secondary battery according to claim 9, wherein the negative electrode active material includes non-graphitizable carbon, graphitizable carbon, graphite, pyrolytic carbon, coke, glassy carbon, organic polymer sintered body, carbon fiber, activated carbon, or graphite including a silicon-based material and a silicon-based material.

* * * * *